W. M. AND P. D. ROBERTS.
MACHINE FOR AND METHOD OF MAKING PASTRY CONES.
APPLICATION FILED FEB. 7, 1921.

1,423,260.

Patented July 18, 1922.
8 SHEETS—SHEET 1.

INVENTORS
WEBSTER M. ROBERTS
PARK D. ROBERTS,
BY
Toulmin & Toulmin
ATTORNEYS.

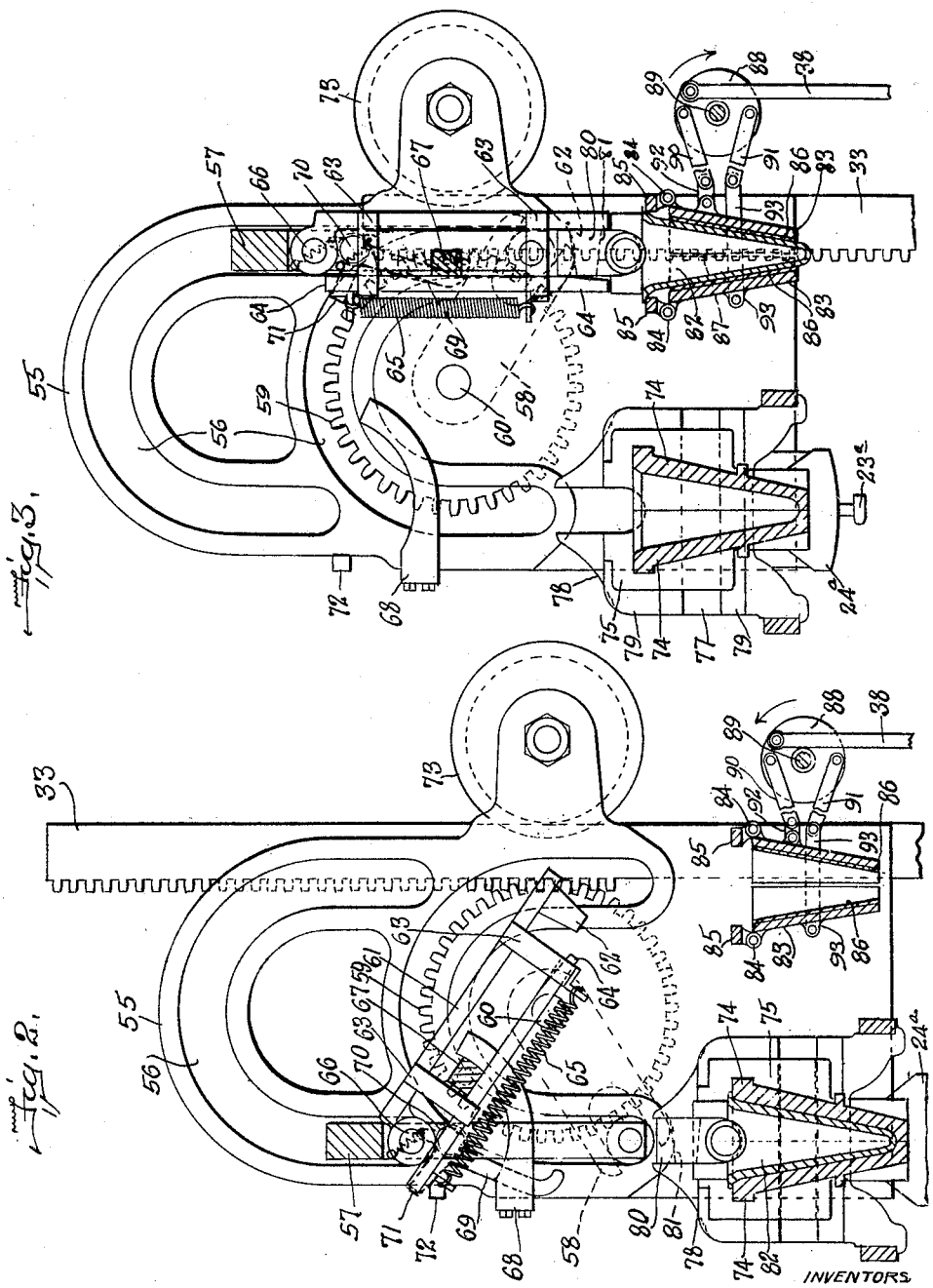

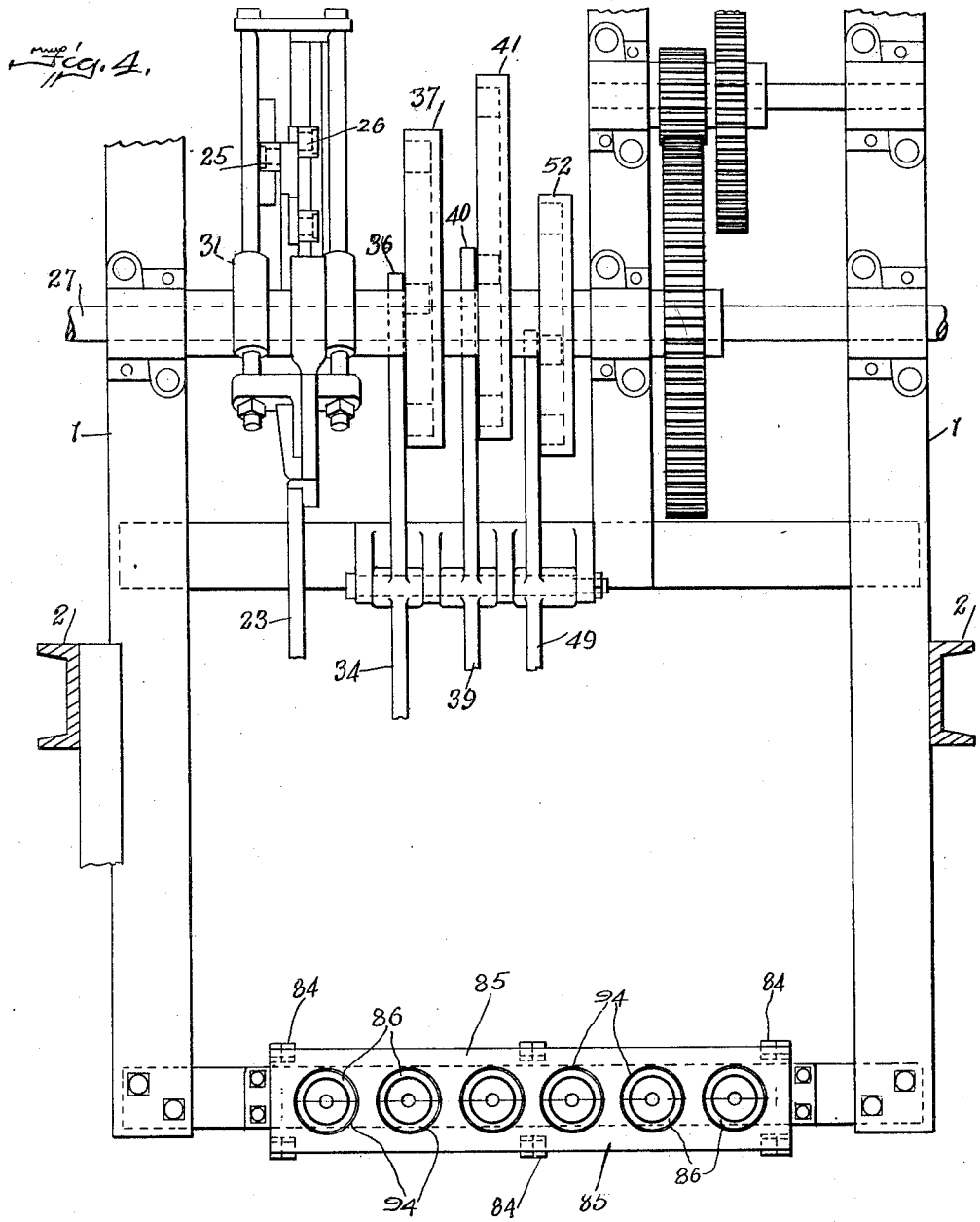

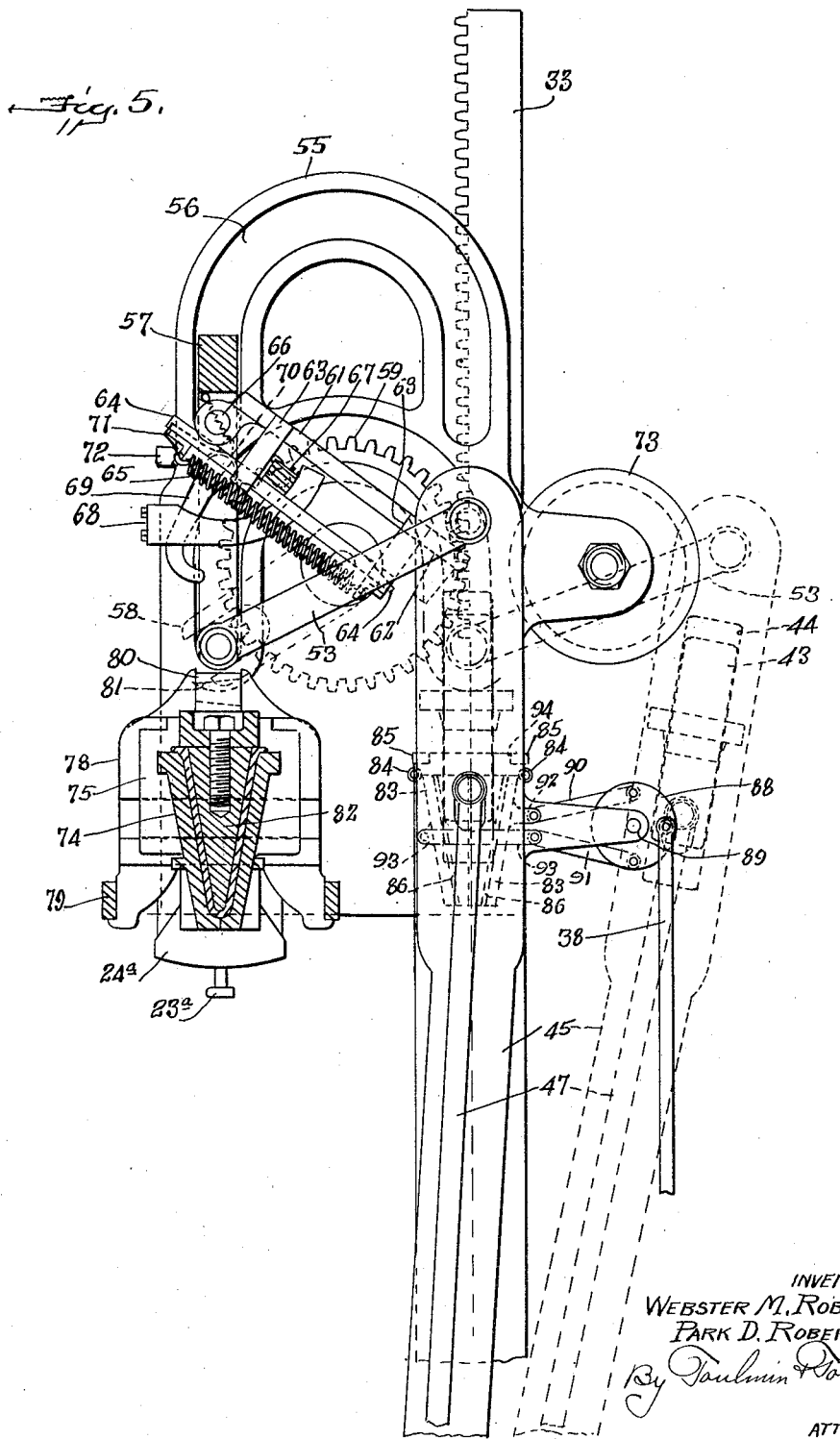

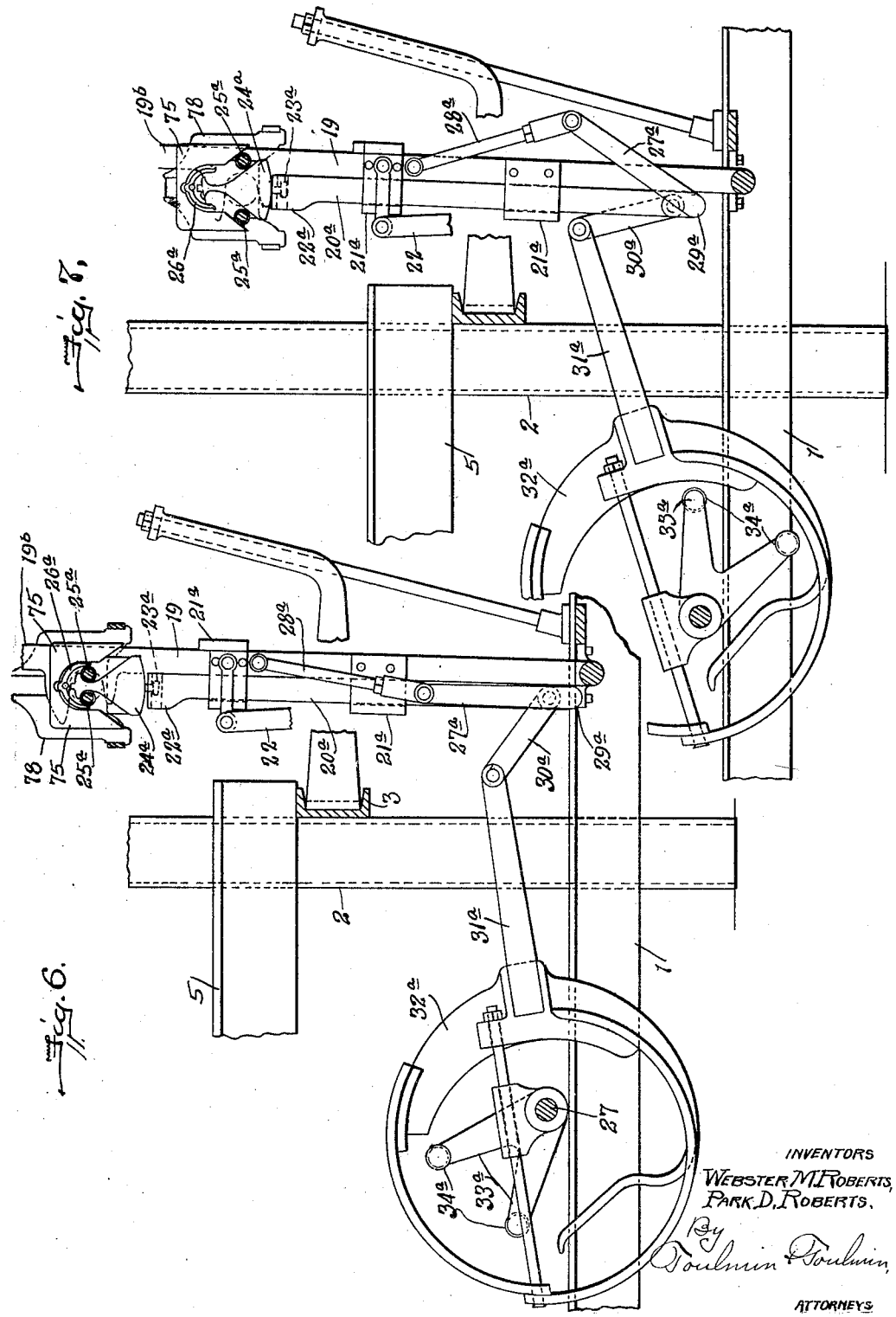

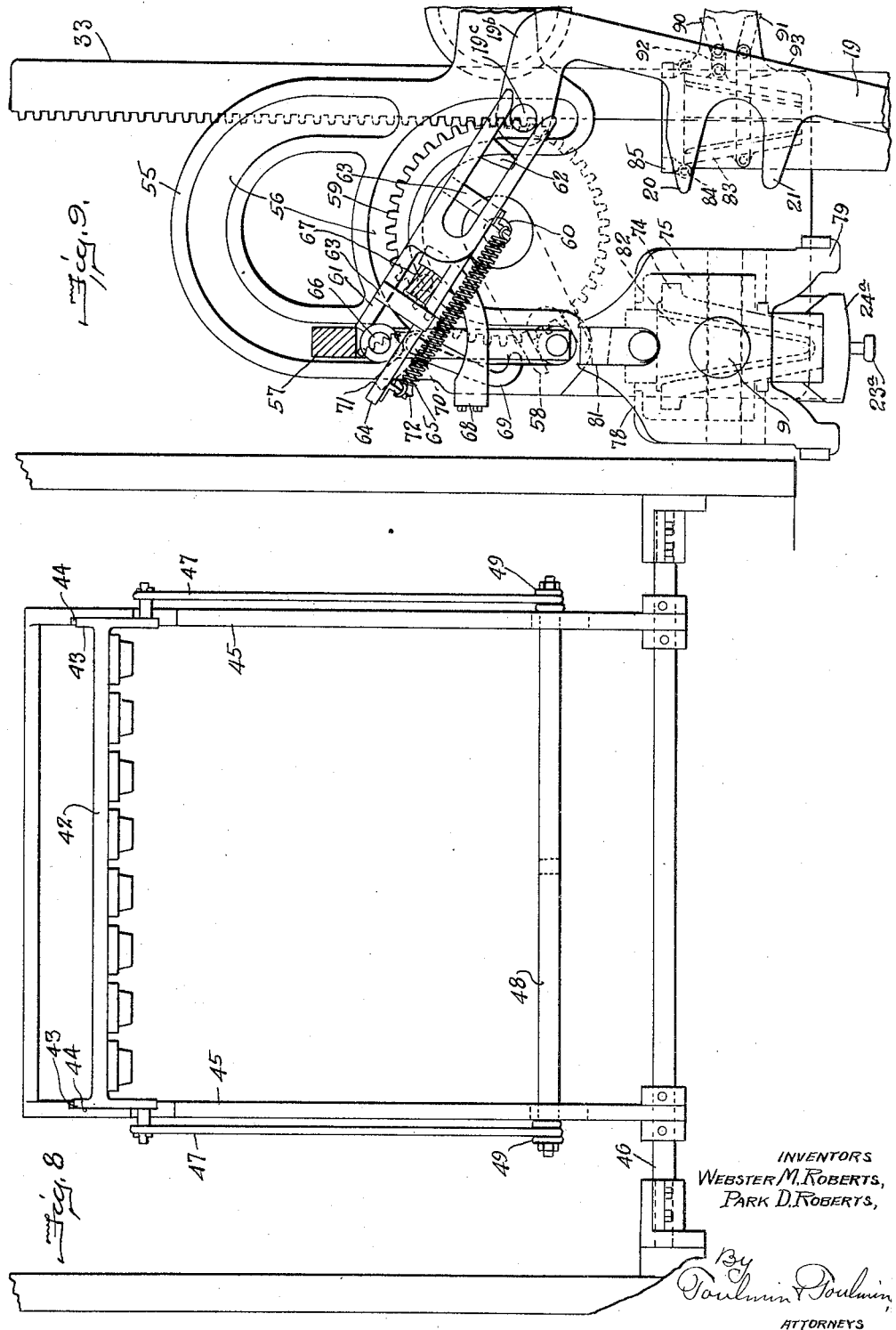

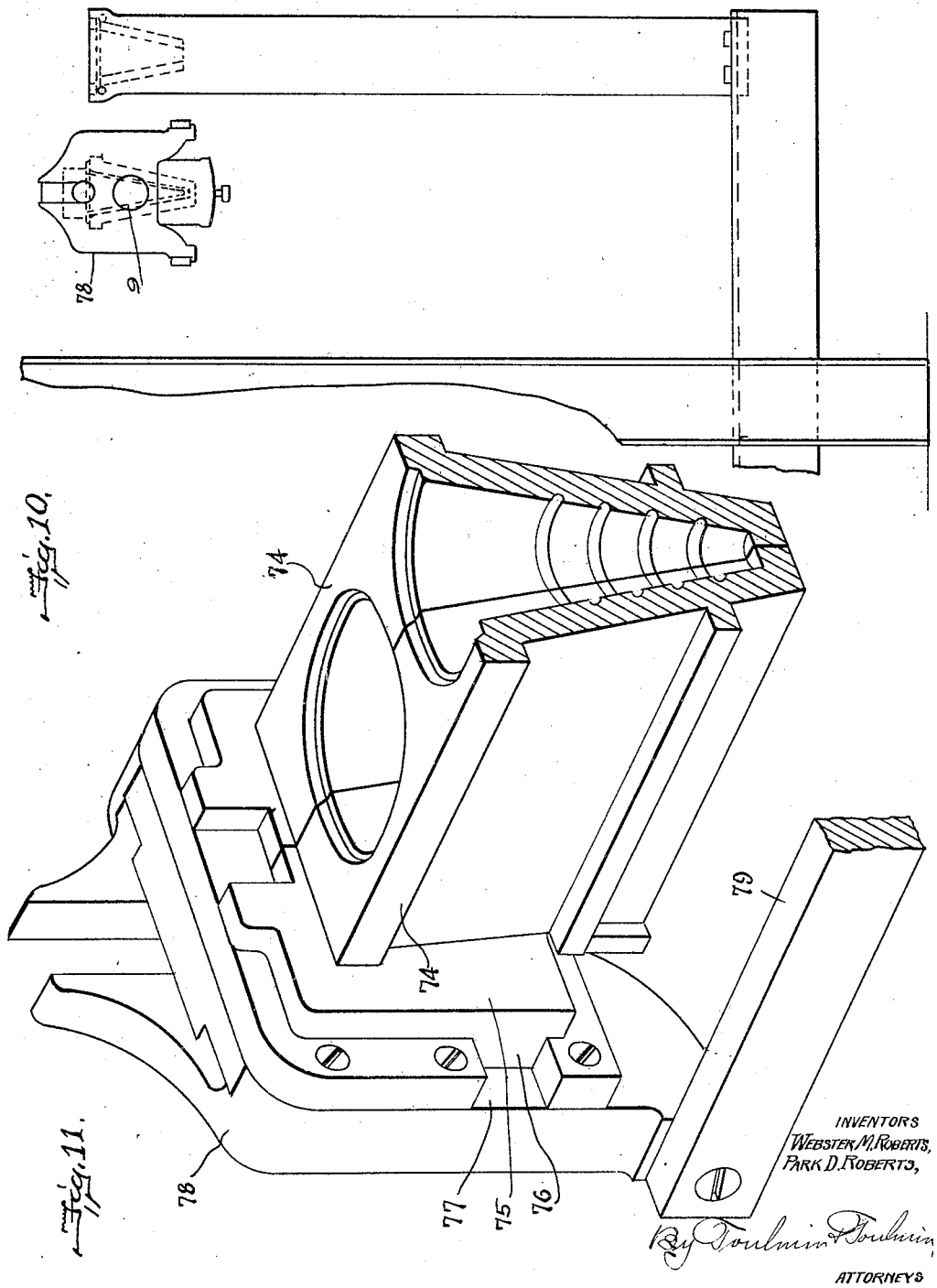

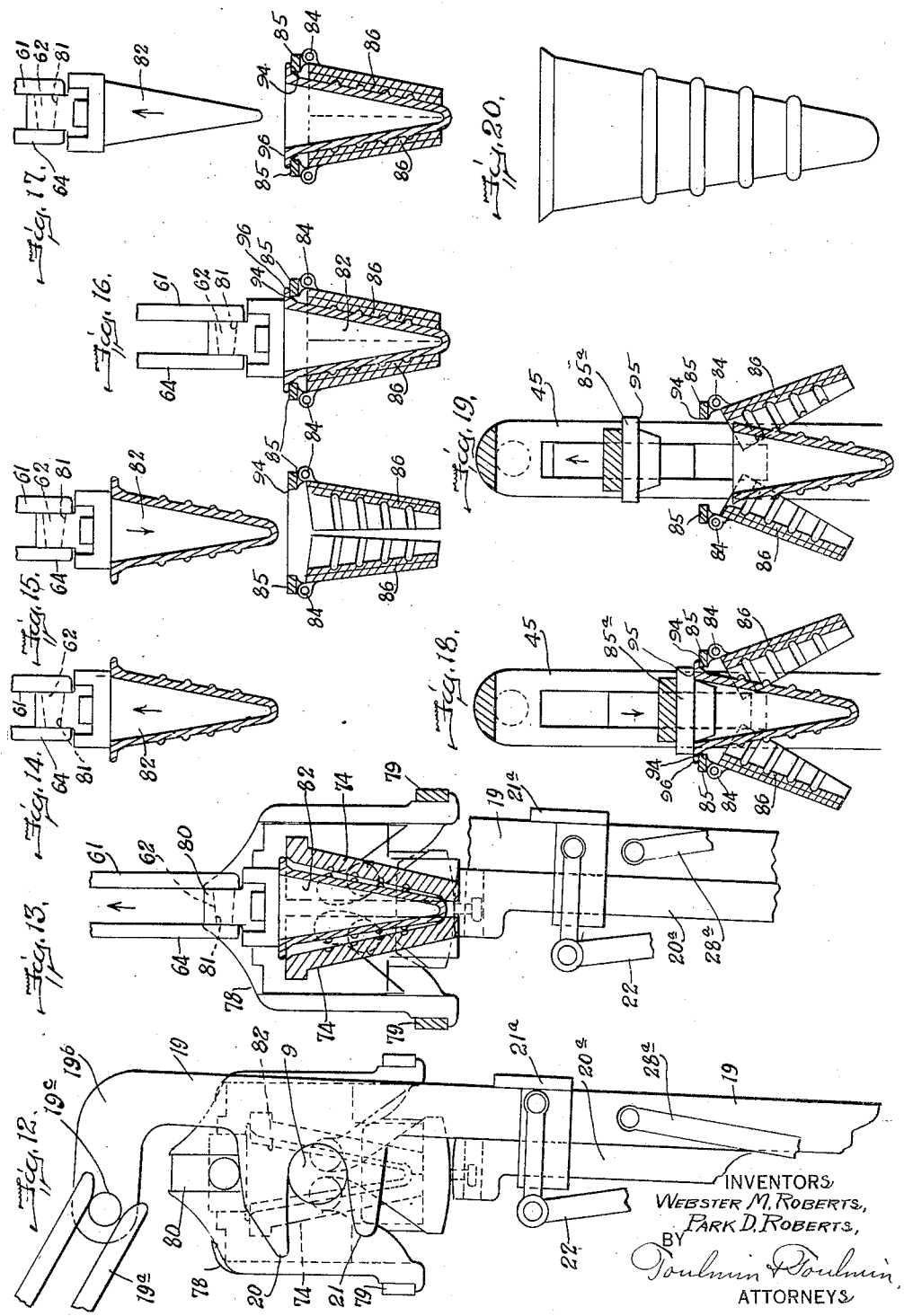

UNITED STATES PATENT OFFICE.

WEBSTER M. ROBERTS AND PARK D. ROBERTS, OF ST. JOSEPH, MISSOURI.

MACHINE FOR AND METHOD OF MAKING PASTRY CONES.

1,423,260. Specification of Letters Patent. Patented July 18, 1922.

Application filed February 7, 1921. Serial No. 443,063.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Machines for and Methods of Making Pastry Cones, of which the following is a specification, reference being had therein to the accompanying drawing.

This invention relates to improvements in machines for and in a method of making pastry cones.

In respect to the machine the invention refers particularly to:—

(1) An organization comprising openable or two part baking molds to receive the batter, forming cores operable to enter into the molds and remain during the baking operation, for forming the interior of the product, to withdraw therefrom, after the mold has slightly opened to free itself from the cones, the cores taking with them the baked product, and cone grippers adapted to receive the cores and the impaled cones, to engage the cones and hold them while the cores withdraw and then to discharge the cones.

(2) This organization set forth with the further provision that the mold shall come to rest and remain momentarily stationary during the period of the said partial opening of the mold halves and the withdrawal of the cores with the impaled cones; and also with the further provision that the cone grippers will close upon the impaled cones after the cores enter the grippers to hold the cones while the cores withdraw and will then open to discharge the cones.

(3) And the further provision that the devices comprising the cone grippers will by reason of the nature of their faces which contact when the cones take hold and retain the cones while the cores are withdrawing, these grippers then operating to discharge the cones.

In respect to the method our invention relates particularly to:—

(*a*) The opening of one of the cone-forming instrumentalities to sever such instrumentality from the cones.

(*b*) The withdrawal of the other cone-forming instrumentality with the cones impaled thereon.

(*c*) The entrance of said latter instrumentality and impaled cones into a gripping instrumentality where a gripping action upon the cones is effected.

(*d*) The separation of the impaling instrumentality from the cones while the latter are being subjected to the gripping action.

(*e*) In subjecting the cones to a trimming action to remove the surplus material.

(*f*) In relieving the cones of the gripping action at or about the time of the trimming action.

(*g*) In discharging the finished product on the completion of the trimming action.

In the accompanying drawings:

Fig. 2 is an enlarged partial side elevation and sectional view of an openable mold with the core and cone and of a cone gripper with mechanism to transfer the cores and impaled cones from such mold to the gripper;

Fig. 3 is a view like Fig. 2 of the same mechanism with the cone and core transferred and entered into the gripper;

Fig. 4 is a view of the master shaft and the several cams;

Fig. 5 is a detail view showing the connections for swinging the punch members of the trimming mechanism into position over and from the die member;

Fig. 6 is a detail view showing one form of means for opening the mold members, the parts being in position with the mold closed;

Fig. 7 is a similar view of the same mechanism showing the parts in position with the mold opened;

Fig. 8 is an enlarged elevation, partly in section, of the punch member of the trimmer and its actuating mechanism;

Fig. 9 is an enlarged detail view showing the mold, the bar for holding it, the core bar, the core lifting frame and the connection between said frame and the mold-holding bar;

Fig. 10 is a sectional view showing how the grippers and the die member of the trimmer are supported;

Fig. 11 is a partial perspective view and section of one of the molds and adjacent parts;

Fig. 12 is an end elevation of the mold and of the means for opening and closing it and holding it stationary;

Fig. 13 is a cross sectional view of a mold and cone with a core therein, the mold having partially opened and the core being about ready to withdraw with the impaled cone;

Fig. 14 is a view of a core and impaled cone in a position intermediate of the mold and gripper;

Fig. 15 is a sectional view of a gripper partially closed with a core and cone about to enter;

Fig. 16 is a view with the gripper now closed with the cone and core therein, the cone being in the grasp of the gripper;

Fig. 17 is a like view save that now the core is withdrawn and will shortly return to the mold;

Fig. 18 is a similar view except that now the trimmer has entered and is in the act of trimming the cone while the gripper has opened for its quick discharge;

Fig. 19 is a view showing the cone discharging from the gripper and the die member of the trimmer returning to normal position;

Fig. 20 is a detail view of the cone or product.

Figure 1:
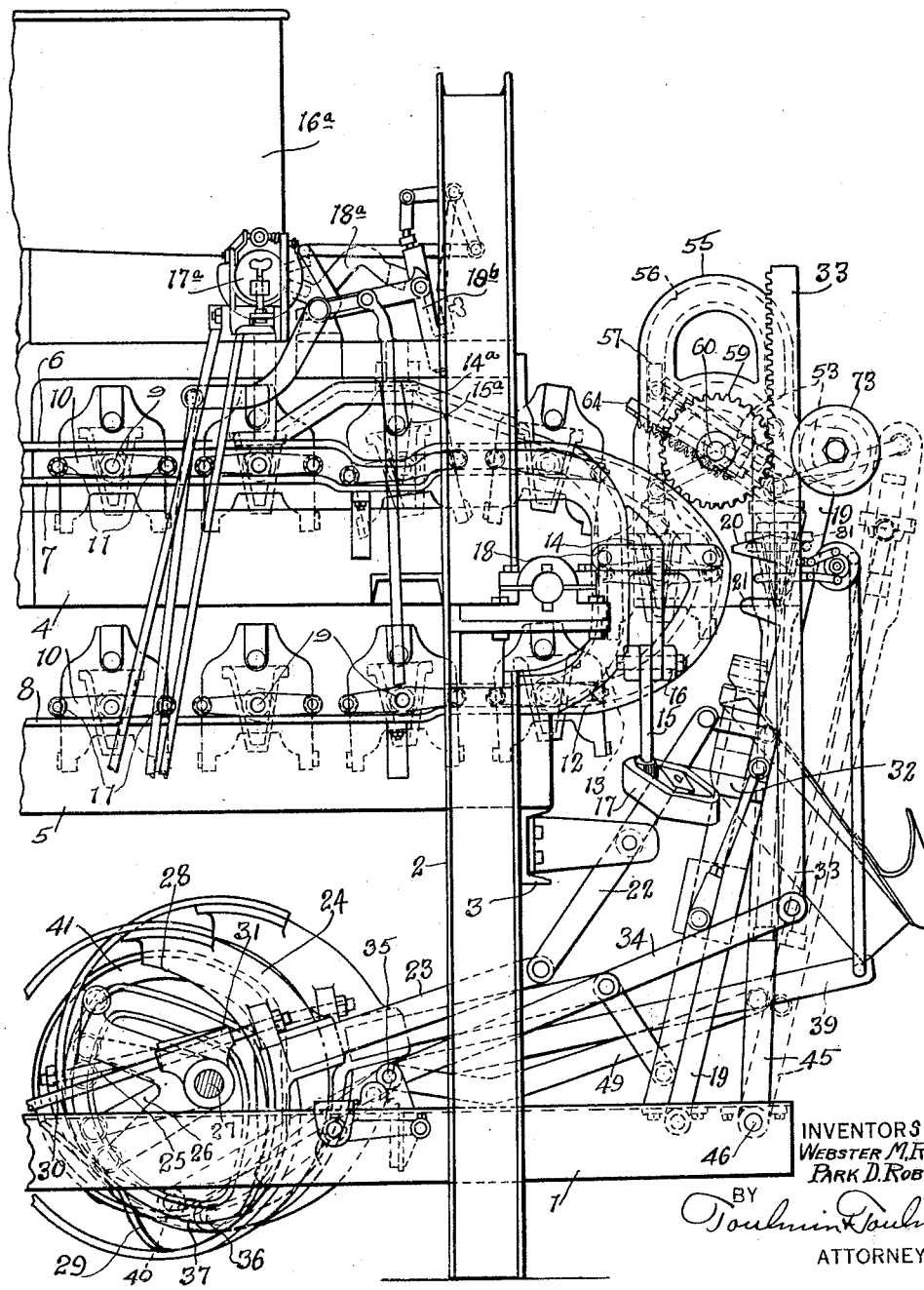
Fig. 1 is a side elevation of an embodiment of our invention with so much of an endless chain type of cone making machine as is necessary to illustrate the application and use of our invention therewith.

As stated, we have illustrated so much of an endless chain type of cone making machine as is necessary to show the application of the present invention to that type of machine.

But it is to be understood that this invention is not in practice limited to use with that particular or endless chain type, as these improvements are applicable to other types of cone making machines. In these illustrations a part of a general frame is indicated by the numerals 1, 2, 3, 4 and 5. This frame work also includes a track comprised of members 6 and 7 for supporting and guiding the mold units—(each mold and its core) as they are made to travel by any suitable mechanism (as for instance, an endless chain) through the circuit of the machine, being likewise guided and supported on the return movement by the rail 8. Of course, it will be understood that when the mold units pass through half of a circle between the guides 6 and 7 and the guide 8 they become inverted, the units being reinstated to upright position, as they are shown in the lower part of Fig. 1, as well as in the upper part.

This inversion of the molds is due to their passing through half a circle at the rear end (not shown) of the machine. They are reinstated to upright position in the manner herein described.

It will be noted that each mold unit has a trunnion 9 which rests on the supports 7 and 8 and each a bar 10 rigid with the mold structure and having rollers 11 which travel on the supports.

When each mold unit reaches the front portion of the machine, that shown at the right in Fig. 1, one end of these bars with their rollers enters the portion 12 of a track while the other ends of the bars and their rollers enter the portion 13 of a track, these track members being contiguous with the upper and lower guides 6, 7 and 8. By reason of the entrance of the respective ends of the bars 10 into these respective track members 12 and 13 the mold units are kept in upright position so that when each unit comes to rest at the discharge location indicated at 14, the contained cores and cones will be in position for withdrawal. And it is at this time that each succeeding mold unit, when it arrives at the position 14 is engaged by fastening-devices. These are comprised, first, of a pivoted arm 15 supported at 16 and operated at one end by a suitable cam 17 and having at the other a cross arm 18 which is made to move over and contact with the upper surface of the bar 10 while a lever 19 is made to move over so that its jaws 20 and 21 will embrace the trunnion 9 and thus hold the mold firmly during the brief period of rest while the mold halves are opening and the cores and cones are automatically withdrawing.

The bar 19 is suitably actuated by a lever 22 which is operated in any desirable manner, as by means of a pitman 23 reciprocated at appropriate intervals by a yoke 24 operated by throw arms 25, 26 mounted on the major shaft 27 and adapted to engage first the cam surface 28 of the yoke 24 and then the cam surface 29. The yoke 24 being mounted on slide rods 30 which travel in bearings 31 suitably supported on the major shaft, the yoke will reciprocate through the means described in a manner and at the proper time to cause the bar 19 and its holding jaws to engage and disengage the mold trunnion. As the cam 17 is carried on a projection 32 secured to the bar 19 it will be understood that the lever 15 and the bar 19 are actuated at the same time to fasten and release the mold. These are merely one form of devices for this purpose and do not constitute in themselves any feature of the present invention as the mold may be held properly in any other manner for purposes of opening them and for the withdrawal of the cores and impaled cones and the return of the cores.

It will be further understood that the machine with which our present invention shall be used will include such features as will properly position the cores with respect to the mold during the period when the batter is being introduced into the cavities and likewise during the period following, as when the batter is throwing off steam during the early stages of the baking operation. One form of such devices is shown at 14ª, being an inclined way or track over which travels the core bar so as to lift the cores somewhat out of the molds, as indicated at 15ª for the introduction of the batter, the remainder of the track 14ª cooperating with the tracks 6 and 7 acting to replace the cores properly in the molds. So far as concerns the present invention all mechanism for these latter purposes are adjuncts of the machine with which this invention is to be used.

Suitable batter mechanism for introducing batter into the molds is also illustrated. This is substantially the same as that shown in Patent No. 1,147,974, to Roberts & Roberts and therefore need not be particularly described. Generally, it comprises a tank 16ª from which the batter moves to a controlling valve device 17ª and from this device tubes 18ª lead to the batter nozzle 18ᵇ. These nozzles are provided, as shown in the prior patent just referred to, with plungers which force the batter from them into the molds.

Also from that patent it will be seen that the nozzles are mounted so as to have bodily pivoted movement, whereby to move them adjacent the cavities of the molds and to return them therefrom so as to permit movement of the molds. The various parts of the batter-filling mechanism are operated by levers, as shown in Fig. 1, which are controlled by suitable cams on the shaft 27.

We would also observe at this point that actuating mechanism is provided for imparting the required movement to the cores, for also imparting the required movement to the devices which open and close the grippers, for positioning the trimmers with respect to the cones in the grippers and for giving the trimmers their trimming and receding movements. For these respective purposes we employ, as one form of mechanism, a rack bar 33 actuated by a lever 34 pivoted at 35 and engaging at its heel 36 with a properly shaped cam 37 carried by the master shaft 27 and adapted to properly time the movement of the rack bar 33 for the due actuation of the cores.

For actuating the opening and closing devices for the grippers we employ, as one means, a pitman 38 connected with a lever 39 also fulcrumed at 35 and having its heel 40 adapted for engagement with a cam 41, shown in Fig. 1, and appearing at 41 in Fig. 4, as also does the yoke 24. And the actuating mechanism for giving the trimmer its trimming and reverse movements is comprised (see Figs. 8) of the cross head 42 having slides 43 which travel in ways 44 formed in the bars 45 pivoted on a shaft at 46, as seen in Figs. 1 and 8. The slides 43 connect with pitmen 47, which, in turn, connect with a sliding shaft 48 mounted in the bars 45 and movable by a lever 49 connected to the shaft 48. The lever 49 is operated by a suitable cam shown at 52 in Fig. 4. This cam is so fashioned that when the bars 45 have swung to bring the punch members of the trimmers over the die members 85 and the cones are in the cone grippers the trimmers will come down upon the cones and act on them in the manner illustrated in Fig. 18. And in order to throw the bars 45 into proper position for this purpose they are equipped with links 53 which connect with a travelling element of the core-moving devices, to be later described, but see Fig. 5.

At or near the discharge place where the mold temporarily comes to rest for discharging purposes we erect, and suitably connect with the frame of the machine, as by brackets, a pair of arches 55, one at either side. These arches contain ways or guides 56 in which travel the core lifters, by which the cores are lifted or removed from the mold while the mold temporarily stands for unloading. These lifters remove the cores with their impaled product over to the cone grippers into which the cores and their cones are inserted. These core lifters comprise a travelling frame or carriage 57 adapted to travel in the ways 56. The carriage is given its travelling movements from over the mold to a position over the cone grippers, and by reverse movement they travel back from over the grippers to over the molds. These motions are imparted to the carriers by an arm 58 connected with a gear wheel 59 whose stud shaft 60 is mounted in the side plates of the arches 55. There are two of these gears 59 each with its arm 58, as also two of the rack bars 33 operated in the manner before described. At suitable intervals the rack bars are reciprocated, first, in a downward movement to turn the arm 58 clockwise to lift the cores from the mold and place them in the cone grippers and then in the opposite direction to actuate the arms anti-clockwise to lift the cores from the grippers and carry them back to the molds.

The lifting frame, comprised of bars 61 carrying pins 62 and plates 63 in which is slidably mounted a bolt 64 controlled by a spring 65 secured at one end to one plate 63 and at the other to the bolt, is pivotally mounted in the carriage 57, as shown at 66. This lifting frame also carries a transverse rod 67 whose office is to ride upon the cam surface of a horn 68 secured to the arch 55, to lift the bolt 64 to a position which will prevent it from striking the core bar when the lifting frame 61 is swung down by a means to be presently stated.

If it be now assumed that the carriage 57 is elevated from the position shown in Fig. 2, by the means before described, and the lifting frame and cores be thereby also elevated, it will soon transpire that the bar 67 will be lifted clear of the horn 68 and that the bolt 64 will tend to snap downward by the action of the spring 65 and assume the position against the core bar, as shown in Fig. 3, to tend to keep the lifting pin 62 in place.

But in order to make the pivotal connection of the lifting frame 61 with the carriage 57 substantially rigid to prevent any swaying of the frame and the cores we provide a device to lock the frame with reference to the carriage.

This device consists of a hook 69 secured to the carriage at 70 and arranged to receive the cross bar 67 when it and the hook are sufficiently elevated above the horn 68. With the bar 67 resting in the hook 69 the lifting frame will be prevented from any swinging motion during the travel of the carriage 57.

On the return of the carriage and lifting frame from the position shown in Fig. 3 to the position where the cores are returned to the mold it becomes necessary to draw the bolt 64 upward so that when, a little later, the lifting frame is to disengage from the core bar, the bolt will not stand in the way; and also necessary to disengage the cross bar 67 from the hook. This latter is done by the extension 71 of the hook coming in contact with a lug 72 on the arch 55. This snaps the hook from under the bar 67 and then when this bar reaches the horn 68 the bolt 64 is prevented from further descent while the frame 61 goes on down to the point of delivering the cores in the mold.

In order to insert the lifting pin 62 into the orifice in the core bar, and in order to remove the pin from the core bar some instrumentality must be employed. A convenient device for this purpose consists of an extension $19^b$ on the lever 19 and a roller $19^c$ adapted to engage with the arm $19^a$ secured to the lifting frame 61, as indicated in Fig. 9, so that when this lever 19 moves laterally to cause its jaws 20 and 21 to engage with the mold to hold it during the withdrawal and until the return of the cores, the roller $19^c$ will cause the frame 61 to swing down and its pin 62 to enter the orifice in the core bar. And likewise when the lever 19 withdraws to release the mold the roller $19^c$ will swing this frame 61 and disengage the lifting pin 62 from the core bar. A guide roller 73 acts to guide the rack bar 33 and keep it in mesh with the gear wheel 59.

The several instrumentalities we have thus described for these several operations may, of course, be varied in type and construction so long as the essential functions set forth are performed. We are not limiting ourselves to special devices for these functional purposes.

We shall now describe the mold, the cores and the cone grippers and their relation. See particularly Figs. 2, and 3. Besides the features of the trunnions 9 and guiding bars 10 and rollers 11, before referred to, each mold consists of a section or half 74 having heads 75 provided with slides 76 which are fitted in ways 77 formed in the end plates 78. These end plates are connected by side bars 79 and thus constitute in effect a frame in which the mold halves are mounted in the manner just stated. (See particularly Fig. 11.)

In Figs. 6 and 7 we have shown one form of mechanism for opening and closing the molds. It comprises a sliding bar $20^a$ mounted within guides $21^a$ on the bar 19. The upper end of the bar $20^a$ has a jaw $22^a$ adapted to slide over a stud $23^a$ on a cam block $24^a$ which acts against rollers $25^a$ mounted on the head 75 of the mold halves. When the mold halves are closed, as when the parts are in the position shown in Fig. 6, these rollers come within spring clamps $26^a$ secured to the plates 78 to hold the mold halves together with sufficient tension to retain the batter. In this position of the parts the cam block $24^a$ has its narrow neck between the rollers $25^a$. When, however, the cam block is advanced against the rollers, as shown in Fig. 7, it spreads the rollers $25^a$ and opens the halves of the mold and when the cam block is reversed the rollers travel inward and the mold halves are closed.

The means for actuating the sliding bar $20^a$ comprises a toggle composed of links $27^a$ and $28^a$, the latter pivoted to the bar 19 and the former carried by a rockshaft $29^a$ having an arm $30^a$ actuated by the pitman $31^a$ carried by a yoke $32^a$ actuated by the arms and rollers $33^a$ $34^a$ carried by the master shaft 27. In this way the toggle $27^a$, $28^a$ is made to raise and lower the sliding bar $20^a$. As it is mounted on the bar 19, which has a swinging movement produced through the devices 17, 22, 23 and 24, as before described, it swings the bar $20^a$ into proper position with reference to the cam block $24^a$.

We shall now refer to the cores which comprise a core bar 80 having orifices 81 for the entrance of the lifting pins 62 and a series of conical cores 82 like in number and shape to the cavities in the molds. There is a set of cores for each mold. The cores are just enough smaller than the cavities to leave an intervening space to be occupied by the batter, which when baked, will form the cone or product. Due to the expansion of the steam produced from the moisture in the batter the cores are slightly lifted at one stage of the operation causing a slight overflow of the batter which leaves a narrow rim or bead on the exterior of the cone which is later trimmed off.

When the cores are lifted out of the molds, in the manner before described, after the molds have slightly opened, they will take with them the now baked cones. The next step is to remove, positively, yet delicately and very rapidly, the cones from the cores. The instrumentality for this purpose we have denominated as cone grippers by which we mean that the instrumentality takes such hold upon the cones as to permit the separation of the cores and cones without injury to the latter, and also in a manner to permit the cones to be rapidly released. The form of this gripper which we have selected for illustration, we will now describe. It comprises a series of pockets corresponding in number to the cones to be stripped and corresponding essentially to them in shape. Each pocket is formed by walls, such as designated at 83, hinged at 84 and divided into sections, say two to each gripper proper. The pivots 84 are carried by any suitable support, but preferably by the die member 85 of the rimming mechanism, the punch member entering the die member, as will presently appear.

It will now be noted that the walls 83 are in pairs so that they can be separated by swinging on their hinges. They are configurated with filigree work 86, to conform to the filigree work on the cones to take hold of the cones and to hold them while the cores are being withdrawn. When the cores with the impaled cones enter the cone grippers, as shown in Fig. 3, the grippers are slightly open in the sense that their walls stand just a little apart, as indicated by the dotted lines 87. We have referred to the pitman 38 and lever 39 and the operating cam to actuate the sections or halves of the grippers. The pitman 38 connects with disks 88 mounted on a cross shaft 89 supported in any suitable manner. When the disks 88 are rotated in the direction of the arrow shown in Fig. 2 they will close from a slightly open position upon and take hold of the cones, which operation is timed by a suitable cam 41 (see Fig. 4) to take place just as the cores with the impaled cones have fully entered the grippers. The grippers are shown in Fig. 2 in slightly open position to receive the cones and are in closed or clamping position, as shown in Fig. 3. The disks 88 are connected with the respective gripper members by links 90 and 91 through bars 92 and 93.

Referring to Figs. 2 and 3 it will now be understood that a series of cores with the impaled cones will be lifted, in the manner before described, from the previously opened mold and be swung over and entered into the grippers, the latter being then slightly open, as shown in Fig. 2. When the cores and cones have fully entered into the grippers they will have closed, as shown in Fig. 3, in which the empty mold is on the one hand and the filled gripper on the other. The cones being now under the control of the grippers, the cores can and do withdraw and quickly return to reenter the mold from which they brought these particular cores, when they will be released from the core lifters and their mold will be closed and move on and be manipulated for refilling of the mold cavities. The cores having now withdrawn and left the cones in the grippers, the grippers will open wide, severing themselves from the cones and permitting the latter to rapidly and quickly discharged or descend after they have been trimmed or relieved of their excrescent edges by the trimmer.

Coming now to the trimming operation we would observe that immediately the cores have withdrawn from the cones which are now in the grippers, the punch members 85$^a$ of the trimmers swing over from the position shown in Fig. 1 to that shown in Fig. 18, and undergoing downward movement effected by the mechanism shown in Fig. 8, will enter the die members 85 and also enter the cones. The shearing edge 94 coacting with the shearing edge 95 now severs the surplus bead or material 96 from the cones. The grippers being now opened, as before stated, the complete product or cones rapidly fall in such succession as amounts almost to a shower, all of these operations being properly synchronized and rapid and precise. After each trimming operation the punch members withdraw because by that time another set of cores with their impaled cones are on their way to the grippers which in the interval have almost closed, leaving their final closing to take place when the cores and impaled cones shall have actually entered the grippers, as before described.

For a fuller understanding and disclosure we will now refer to the series of diagrammatic drawings embraced in Figs. 12 to 19, inclusive, first observing that in Fig. 12 the mold is being held stationary and the mold halves have been partially opened, both by the means already described.

Therefore, in Fig. 13 the mold halves stand severed from the cones and the cones impaled on the cores ready to be lifted out.

In Fig. 14 the cores with their impaled cones are in transit from the molds to the grippers.

In Fig. 15 the cores with their impaled cones are just about to enter into the grippers, the grippers being slightly open, but by the mechanism before described, will close as soon as the cores and cones are properly within them.

In Fig. 16 the cones and cores have now arrived in the grippers and the grippers have closed in and gripped the cones.

In Fig. 17 the cones remain gripped in the grippers while the cores have withdrawn and are on their way back to the mold from which they came.

In Fig. 18 the punch member of the trimmer has descended upon the cones and is in the act of trimming off the surplus material while the grippers have opened wide for the descent or discharge of the cones as soon as the trimming is completed.

In Fig. 19 the die member has withdrawn and the cones are on their way out of the grippers.

In Fig. 20 there is illustrated the final product or completed cone.

It will be understood, of course, that the operating and actuating mechanisms set forth herein and features of detail regarding the major elements which enter into the general organization, may be varied anl materially changed without departing from the essence of our invention. These constructions so illustrated and described are the preferred forms, but they do not express the limits of the invention.

The method branch of our invention consists of the following steps, first observing that the method commences with the removal of the baked product from the molds: (a) the opening of one of the cone-forming instrumentalities to sever the adherence thereto of the cones; (b) the removal of the other cone-forming instrumentality from the one first-mentioned with the cones impaled thereon; (c) the entrance of said second instrumentality with the impaled cones into a gripping instrumentality where a gripping action upon the cones is effected; (d) the separation of the impaling instrument from the cones while the latter are being subjected to the gripping action; (e) slightly or totally relieving the cones of the gripping action; (f) subjecting the cones to a trimming action to remove surplus material; and (g) discharging the finished product on the completion of the trimming action.

Thus by our improved apparatus and method we provide for the rapid and economical treatment of batter cones in all of those steps which go to their completion from and after they have been baked, which latter may be done in any of the several ways already known in this art.

Having thus fully described our invention what we claim as new and desire to secure by Letters Patent, is:—

1. In a cone making machine, the combination, with a cone-forming unit comprising a separable mold with cavities and corresponding cores, of cone grippers comprising members adapted to receive the cores with their impaled cones, mechanism to open and close the mold and mechanism to withdraw the cores and impaled cones from the mold, insert them into the grippers and to return the cores to the mold, and other mechanism to cause the grippers to release the cones.

2. In a cone making machine, the combination, with a cone-forming unit comprising a separable mold with cavities, and corresponding cores, of cone grippers comprising adjustable members adapted to receive, hold and release the cones, mechanism to hold the mold stationary momentarily, mechanism to open and close the mold and mechanism to remove the cores with the cones impaled thereon from the mold and to cause the cores and cones to enter the grippers and the cores to withdraw therefrom and reenter the mold, and means to cause the grippers to hold and release the cones during the interval between the departure and return of the cores.

3. In a cone making machine, the combination, with a separable mold and corresponding cores, of cone grippers comprising movable members, mechanism to open and close the mold, mechanism to remove the cores with the cones impaled thereon from the mold, to insert them in the grippers and return the cores to the mold, and other mechanism adapted to cause the gripper members to clamp the cones when they have properly entered the grippers and to release the cones after the cores have broken contact with the cones.

4. In a cone making machine, the combination, with a separable mold, mechanism to open and close the mold, and cone grippers in convenient juxtaposition therewith, the grippers comprising operable members for gripping and releasing the cones, of cores corresponding with the mold cavities and mechanism adapted to automatically engage with the cores and remove them from the mold with the cones impaled thereon, to thence travel with the cones into the grippers and back again from the grippers to the mold after the cores sever connection with the cones, and devices to cause the grippers to take hold of and release the cones.

5. In a cone making machine, the combination, with a cone-forming unit comprising a separable mold with cavities and corresponding cores, of cone grippers comprising members adapted to receive the cores with their impaled cones, mechanism to open and close the mold, and mechanism to withdraw the cores and impaled cones from the mold, insert them into the grippers and to return the cores to the mold, other mechanism to cause the grippers to release the cones, and trimming mechanism adapted to trim the cones at a time between the withdrawal of the cores and the discharge of the cones from the grippers.

6. In a cone making machine, the combination, with a cone-forming unit comprising a separable mold with cavities, and corresponding cores, of cone grippers comprising adjustable members adapted to receive, hold and release the cones, mechanism to hold the mold stationary momentarily, mechanism to open and close the mold, and mechanism to remove the cores with the cones impaled thereon from the mold and to cause the cores and cones to enter the grippers and the cores to withdraw therefrom and reenter the mold, means to cause the grippers to hold and release the cones during the interval between the departure and return of the cores, and trimming mechanism adapted to trim the cones at a time between the withdrawal of the cores and the discharge of the cones from the grippers.

7. In a cone making machine, the combination, with a separable mold and corresponding cores, of cone grippers comprising movable members, mechanism to open and to close the mold and mechanism to remove the cores with the cones impaled thereon from the mold, to insert them in the grippers and return the cores to the mold, other mechanism adapted to cause the gripper members to clamp the cones when they have properly entered the grippers and to release the cones after the cores have broken contact with the cones, and trimming mechanism adapted to trim the cones at a time between the withdrawal of the cores and the discharge of the cones from the grippers.

8. In a cone making machine, the combination, with a separable mold and cone grippers in convenient juxtaposition therewith, the grippers comprising operable members for gripping and releasing the cones, and mechanism to open and close the mold, of cores corresponding with the mold cavities and mechanism adapted to automatically engage with the cores and remove them from the mold with the cones impaled thereon, to thence travel with the cones into the grippers and back again from the grippers to the mold after the cores sever connection with the cones, devices to cause the grippers to take hold of and release the cones, and trimming mechanism adapted to trim the cones at a time between the withdrawal of the cores and the discharge of the cones from the grippers.

9. In a cone making machine, the combination, with a separable mold and corresponding cores, of devices to momentarily hold the mold stationary, mechanism to open and close the mold while so held, and mechanism adapted to remove the cores from the mold, to deliver the cores to a point somewhat remote from the mold and to return the cores into the mold.

10. In a cone making machine, the combination, with a separable mold, mechanism to open and close the mold, and devices to hold it momentarily stationary while it is being opened and closed, of corresponding cores and core actuating mechanism comprising ways, a carriage adapted to travel therein, and a lifting frame mounted on the carriage, devices to cause the frame to engage with and disengage from the core bar, and operating devices to cause the carriage to travel in the ways.

11. In a cone making machine, the combination, with a separable mold and cone grippers, of cores adapted to enter and withdraw from the mold and enter and withdraw from the grippers, mechanism to open and close the mold, and actuating mechanism to impart such motions to the cores, said mechanism comprising an arch having ways, a carriage adapted to travel in the ways, a lifting frame connected with the carriage and adapted to engage and disengage the bar of the cores, a gear, crank and rack mechanism to actuate the carriage, and devices to actuate the lifting frame into and out of engagement with the bar.

12. In a cone making machine, the combination, with a separable mold for forming and releasing the cones and cone grippers adapted to receive the cones from the mold and to grip and to release them.

13. In a cone making machine, the combination, with a separable mold for forming and releasing cones, of a cone gripper adapted to receive the cones and to release them, and devices to hold the grippers slightly open until the cones have properly entered, then to close the grippers to clamp the cones and later to open the grippers to discharge the cones.

14. In a cone making machine, the combination, with a separable mold for forming and releasing the cones, of cone grippers in proximity thereto, and trimming mechanism adapted to act on the cones at a point between the mold and the grippers.

15. In a cone making machine, the combination, with a separable mold for forming and releasing the cones, of grippers in proximity thereto, the grippers comprising members adapted to close upon and recede from the cones when they have entered within the grippers, and trimming devices comprising a die member located near the entrance to the grippers and a punch member adapted to descend to the die member and trim the cones.

16. In a cone making machine, the combination, with a separable mold having cone cavities, and mechanism to open and close the mold, of cone grippers forming cavities, and cores adapted to impale the cones thereon in the act of cooperating with the mold in forming the cones, and further adapted to withdraw from the mold after the mold is opened with the cones impaled thereon and to enter the grippers and withdraw, leaving the cones gripped by the grippers.

17. The herein described method of treating batter cones after they are baked, consisting in opening an exterior forming-instrumentality; in removing them therefrom impaled on an interior forming instrumentality; in introducing such latter instrumentality with the impaled cones into a gripping agency; in separating this interior forming instrumentality from the cones while they are under the control of the gripping agency; and in releasing the cones from such gripping agency to effect their discharge or delivery.

18. The herein described method of treating batter cones after thay are baked, consisting in opening an exterior forming-instrumentality; in removing them therefrom impaled on an interior forming instrumentality; in introducing such latter instrumentality with the impaled cones into a gripping agency; in separating this interior forming instrumentality from the cones while they are under the control of the gripping agency; in releasing the cones from such gripping agency; and in removing from the cones the surplus material.

19. The herein described method of treating batter cones after they are baked, consisting in opening an exterior forming instrumentality; in withdrawing the cones from within such outer forming instrumentality by their adherence to an inner forming instrumentality; in transferring the cones while on this latter instrumentality into a gripping agency which acts on the cones with a gripping effect; in maintaining such latter effect during the withdrawal of the impaling agency; in releasing such gripping action; in applying a trimming action to the cones after such withdrawal; and in discharging the cones as the trimming step is completed.

In testimony whereof we affix our signatures.

WEBSTER M. ROBERTS.
PARK D. ROBERTS.